(12) United States Patent
Bourgeois et al.

(10) Patent No.: US 9,198,539 B1
(45) Date of Patent: *Dec. 1, 2015

(54) TEPPANYAKI GRILL

(75) Inventors: Barbara Bourgeois, Jefferson, LA (US);
Michael Bourgeois, Kenner, LA (US);
Norman Bourgeois, Jefferson, LA (US);
Michael Lawson, New Braunfels, TX (US)

(73) Assignee: METAL FUSION, INC., Jefferson, LA (US)

( * ) Notice: Subject to any disclaimer, the term of this patent is extended or adjusted under 35 U.S.C. 154(b) by 229 days.

This patent is subject to a terminal disclaimer.

(21) Appl. No.: 13/231,597

(22) Filed: Sep. 13, 2011

Related U.S. Application Data

(63) Continuation of application No. 12/170,167, filed on Jul. 9, 2008, now Pat. No. 8,020,546.

(60) Provisional application No. 60/948,623, filed on Jul. 9, 2007.

(51) Int. Cl.
*A47J 37/06* (2006.01)
*A47J 37/07* (2006.01)
(Continued)

(52) U.S. Cl.
CPC .......... *A47J 37/0781* (2013.01); *A47J 37/0682* (2013.01); *A23L 1/01* (2013.01); *F24C 3/08* (2013.01); *F24C 15/06* (2013.01); *F24C 15/08* (2013.01); *F24C 15/108* (2013.01)

(58) Field of Classification Search
CPC .... A47J 37/0781; A47J 37/0682; A23L 1/01; F24C 3/08; F24C 15/06; F24C 15/08; F24C 15/108

USPC ... 126/9 R, 25 R, 33, 37 R, 39 B, 39 H, 39 R, 126/50, 211, 215, 217, 261; 99/357, 422; D7/335
IPC ................. A23L 1/025, 1/25, 1/01; A47J 37/00, A47J 37/06, 27/00, 27/14; A47B 37/04; F23C 5/00; F24C 5/18, 5/20, 15/08
See application file for complete search history.

(56) References Cited

U.S. PATENT DOCUMENTS

| 39,459 | A | * | 8/1863 | Brand | 126/33 |
| 171,444 | A | * | 12/1875 | Stern et al. | 126/33 |

(Continued)

FOREIGN PATENT DOCUMENTS

| FR | 2747283 A1 * | 10/1997 | |
| GB | 2084715 A * | 4/1982 | A47J 37/07 |
| JP | 07284413 A * | 10/1995 | A47B 3/08 |

OTHER PUBLICATIONS

AU 2005202318 A1; Jan. 2006; Abstract of Australian Publication.*
(Continued)

*Primary Examiner* — Gregory Huson
*Assistant Examiner* — Daniel E Namay
(74) *Attorney, Agent, or Firm* — Garvey, Smith, Nehrbass & North, L.L.C.; Charles C. Garvey, Jr.; Vanessa M. D'Souza

(57) ABSTRACT

An outdoor grill of a teppanyaki style provides a grilling surface fueled with a propane/butane canister and burner arrangement. The grilling surface is surrounded by cool zones, one of which is in the form of easily removable tiles or plates. The pedestal and top are uniquely configured to provide multiple sitting areas with knee areas in between the pedestal and top periphery.

21 Claims, 12 Drawing Sheets

(51) Int. Cl.
*A23L 1/01* (2006.01)
*F24C 15/06* (2006.01)
*A47J 37/00* (2006.01)
*F24C 3/08* (2006.01)
*F24C 15/08* (2006.01)
*F24C 15/10* (2006.01)

(56) References Cited

U.S. PATENT DOCUMENTS

| | | | | |
|---|---|---|---|---|
| 269,391 A * | 12/1882 | Daniels | | 126/37 R |
| 658,491 A * | 9/1900 | Sibbett | | 126/214 R |
| 1,582,346 A * | 4/1926 | Oster | | 312/236 |
| 1,602,247 A * | 10/1926 | Oster | | 190/12 R |
| 2,013,931 A * | 9/1935 | Teller et al. | | 126/37 R |
| 2,302,984 A * | 11/1942 | Tollzien | | 126/9 R |
| 2,471,420 A * | 5/1949 | Elkin | | 126/33 |
| 2,497,156 A * | 2/1950 | Davis | | 190/12 R |
| 2,728,334 A * | 12/1955 | Paolella | | 126/25 R |
| 2,787,995 A * | 4/1957 | Alter | | 126/25 R |
| 2,800,071 A * | 7/1957 | Begalka | | 99/339 |
| 3,491,744 A * | 1/1970 | Von Kohorn, Jr. et al. | . | 126/25 R |
| 3,561,420 A * | 2/1971 | Paolella | | 126/8 |
| 3,745,303 A * | 7/1973 | Epperson et al. | | 219/218 |
| 3,822,078 A * | 7/1974 | Spadolini | | 297/140 |
| D262,427 S * | 12/1981 | Boston et al. | | D7/333 |
| 4,349,713 A * | 9/1982 | Marsen | | 219/739 |
| 4,362,093 A * | 12/1982 | Griscom | | 99/339 |
| 4,369,763 A * | 1/1983 | Sullivan | | 126/276 |
| D270,987 S * | 10/1983 | Scheufler | | D7/335 |
| D286,002 S * | 10/1986 | Brix | | D7/332 |
| 4,635,613 A * | 1/1987 | Tucker et al. | | 126/25 R |
| 4,706,832 A * | 11/1987 | Citino | | 99/447 |
| 4,788,905 A * | 12/1988 | Von Kohorn | | 99/357 |
| 4,821,704 A * | 4/1989 | Tucker et al. | | 126/299 D |
| 4,840,128 A * | 6/1989 | McFarlane et al. | | 108/25 |
| 4,846,146 A * | 7/1989 | Tucker et al. | | 126/299 D |
| 4,895,131 A * | 1/1990 | Overholser | | 126/41 R |
| 4,899,027 A * | 2/1990 | Wong | | 219/623 |
| 4,910,372 A * | 3/1990 | Vukich | | 219/622 |
| D329,768 S * | 9/1992 | Intardonato | | D6/495 |
| 5,163,415 A * | 11/1992 | Moncrief et al. | | 126/43 |
| 5,183,027 A * | 2/1993 | Saldana | | 126/25 R |
| D389,009 S * | 1/1998 | Baykal | | D7/335 |
| D394,779 S * | 6/1998 | Hilvitz | | D7/335 |
| 5,775,315 A * | 7/1998 | Baykal | | 126/25 R |
| 6,065,466 A * | 5/2000 | Baykal | | 126/41 R |
| D431,133 S * | 9/2000 | Lewis | | D6/486 |
| D454,400 S * | 3/2002 | Nored | | D24/234 |
| 6,837,152 B1 * | 1/2005 | Chiang | | 99/422 |
| 6,924,467 B2 * | 8/2005 | Ellis et al. | | 219/528 |
| D513,796 S * | 1/2006 | Borowske et al. | | D23/343 |
| D590,201 S * | 4/2009 | Zagar | | D7/335 |
| D602,148 S * | 10/2009 | DeFouw et al. | | D23/403 |
| D603,037 S * | 10/2009 | DeFouw et al. | | D23/403 |
| D624,781 S * | 10/2010 | Allen et al. | | D7/332 |
| 8,020,546 B1 | 9/2011 | Bourgeois et al. | | |
| 8,479,721 B2 * | 7/2013 | Graham et al. | | 126/39 E |
| 2005/0109331 A1* | 5/2005 | Chao | | 126/25 R |
| 2005/0205076 A1* | 9/2005 | Boucher | | 126/25 R |
| 2007/0163568 A1* | 7/2007 | Murray et al. | | 126/50 |
| 2007/0267399 A1* | 11/2007 | Flores | | 219/218 |
| 2007/0283946 A1* | 12/2007 | Maruzzo et al. | | 126/50 |
| 2008/0257334 A1* | 10/2008 | Brunner | | 126/39 R |

OTHER PUBLICATIONS

TW 328849 U (Apr. 1982).*

* cited by examiner

TEPPANYAKI GRILL

CROSS-REFERENCE TO RELATED APPLICATIONS

This is a continuation of U.S. patent application Ser. No. 12/170,167, filed Jul. 9, 2008 (issuing as U.S. Pat. No. 8,020,546 on Sep. 20, 2011), which is a nonprovisional of U.S. Provisional Patent Application Ser. No. 60/948,623, filed on Jul. 9, 2007, each of which are incorporated herein by reference.

Priority of U.S. Provisional Patent Application Ser. No. 60/948,623, filed Jul. 9, 2007, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor grills. More particularly, the present invention relates to an outdoor grill of the type that employs a propane or butane fueled burner element placed under a flat grilling surface of a table top, wherein a specially configured tabletop and pedestal arrangement enables a cook to stand next to and cook food on the tabletop grilling surface, and wherein a plurality of individuals are able to sit next to the table at positions next to a cool zone that has quickly removable tiles for easy replacement spaced away from the cook.

2. General Background of the Invention

Teppanyaki is a type of Japanese cuisine. It can also refer to a type of grill. In Japan, Teppanyaki can refer to a number of different dishes that are cooked using a flat iron or other metal plate that is heated. It is popular to locate the hot plate at the center of a diner's table. In America, the Benihana® Restaurant chain has for years employed a Teppanyaki style grilling table for the cuisine that they served.

Teppanyaki style or Asian style table grills are commercially available. One example is a Teppanyaki Asian table grill by Silit-Werke Gmbh & CoKG and sold at www.amazon.com.

A website that offers a Teppanyaki style cooking apparatus is www.cook-n-dine-usa.com. The product offered by Cook 'N Dine.com provides a cooking center which sinks down slightly and thus forms a shallow pit of up to sixteen (16) inches diameter (thermal expansion towards the heat source underneath). A second area is a warming area, said to be a ring of about three (3) inches width surrounding the cooking center. The temperature in that warming area is approximately fifty percent (50%) lower than the set cooking temperature at the cooking center. A third area is a dining area which is the remaining space toward the edge of the table surface which stays completely cold. The Cook 'N Dine.com product provides a foot having stabilizer arms, a pipe or stand, a heating element and a heating element enclosure with a tabletop cooking surface that includes the three aforementioned zones or areas.

Large and relatively expensive, Teppanyaki style grills are available from www.Become.com, such as for example the model DI-48-12KW Drop In Teppanyaki Grill which measures 48"H×23"W×1"deep. A larger 60"×23"×1" model is also available. Similar commercial model Teppanyaki grills are available from www.instawares.com.

The following possibly relevant U.S. Patents are incorporated herein by reference:

TABLE

| PAT. NO. | TITLE | ISSUE DATE |
|---|---|---|
| 5,740,723 | Portable Outdoor High Temperature Griddle | Apr. 21, 1998 |
| 4,724,823 | Radiant Gas Burner Assembly | Feb. 16, 1988 |
| 6,995,340 | Portable Oven | Feb. 7, 2006 |

BRIEF SUMMARY OF THE INVENTION

The apparatus of the present invention comprises an improved teppanyaki style cooking apparatus having a specially configured base or pedestal and table top.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
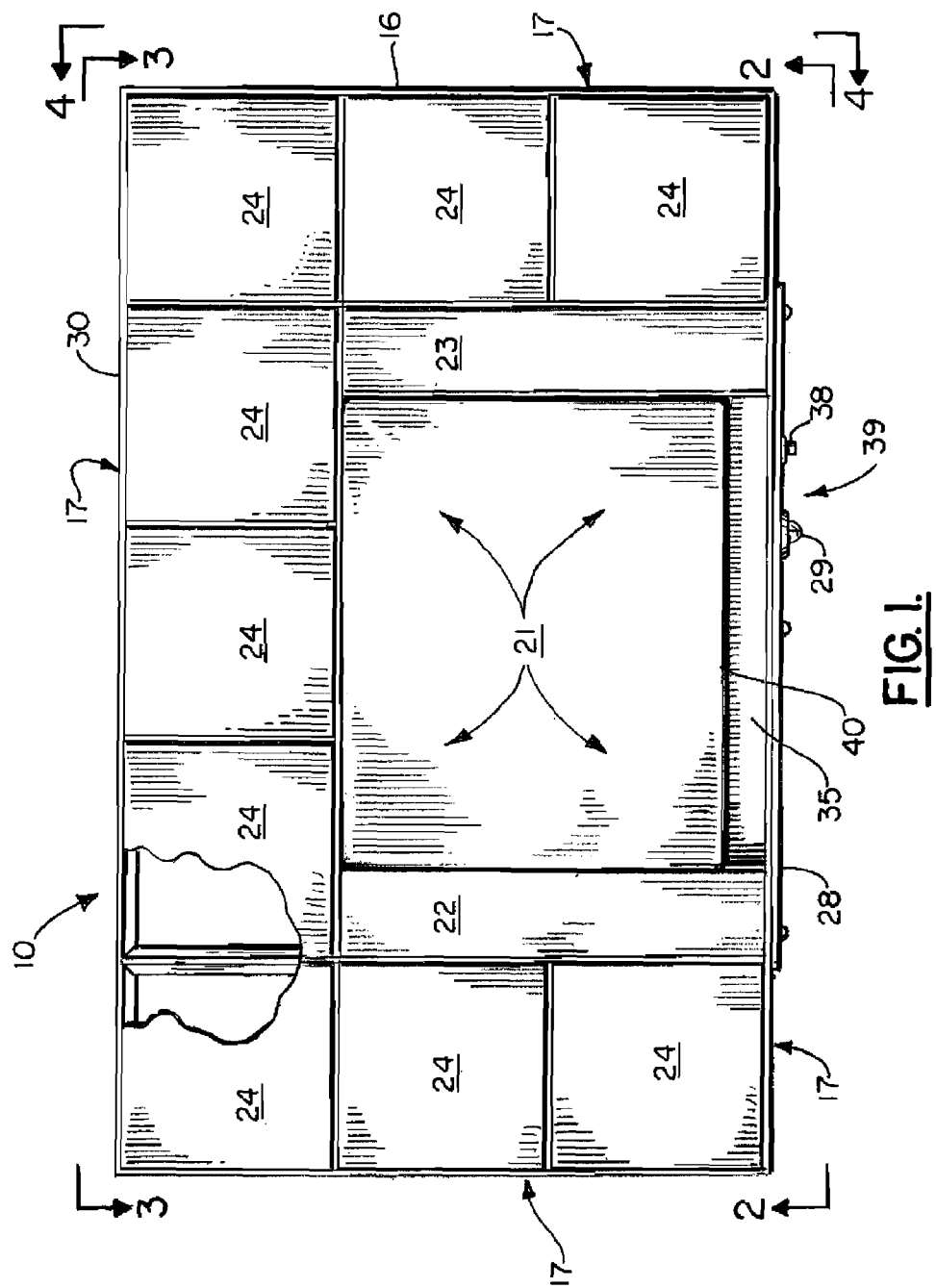
FIG. 1 is a plan view of a preferred embodiment of the apparatus of the present invention.

FIGS. 1-13 show a preferred embodiment of the apparatus of the present invention designated generally by the numeral 10. Outdoor cooking apparatus 10 provides a teppanyaki style grill that can be used to cook or grill food items for one or more persons that are seated around the grill at a position spaced away from a cook who is standing at a cooking station. Outdoor cooking apparatus 10 provides a pedestal 11 that can have one or more pedestal walls 12.

Pedestal 11 provides a pedestal interior 13 having a receptacle 14 for holding a canister 31 of fuel such as a canister 31 of butane or propane or the like. Receptacle 14 can provide a circular opening 15 in a horizontal panel 32 that is attached to the wall or walls 12 of pedestal 11. The receptacle opening that is receptive of canister 31 is designated by the numeral 15.

Figure 2:
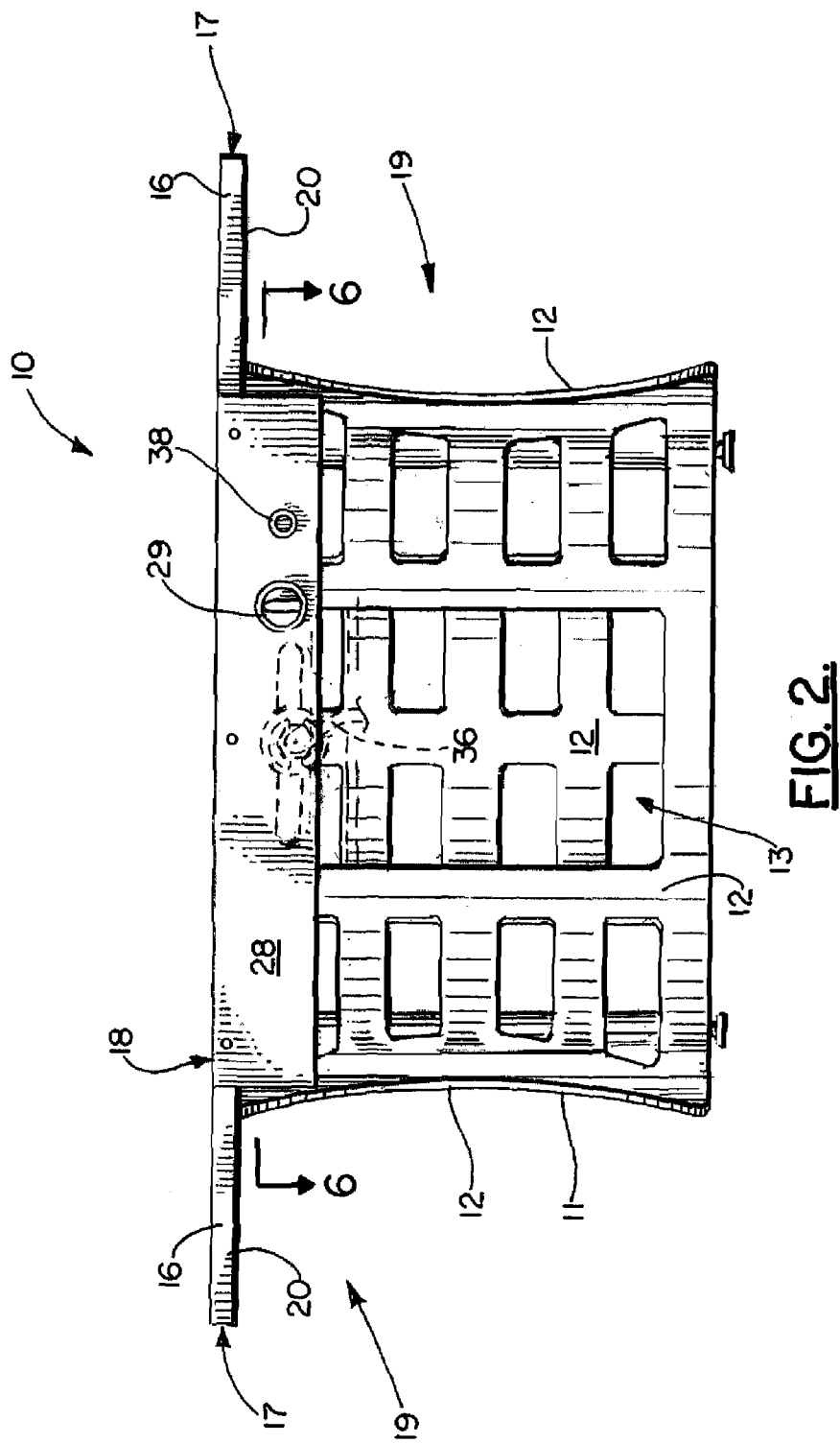
FIG. 2 is a front view of a preferred embodiment of the apparatus of the present invention, taken along lines 2-2 of FIG. 1.
Figure 3:
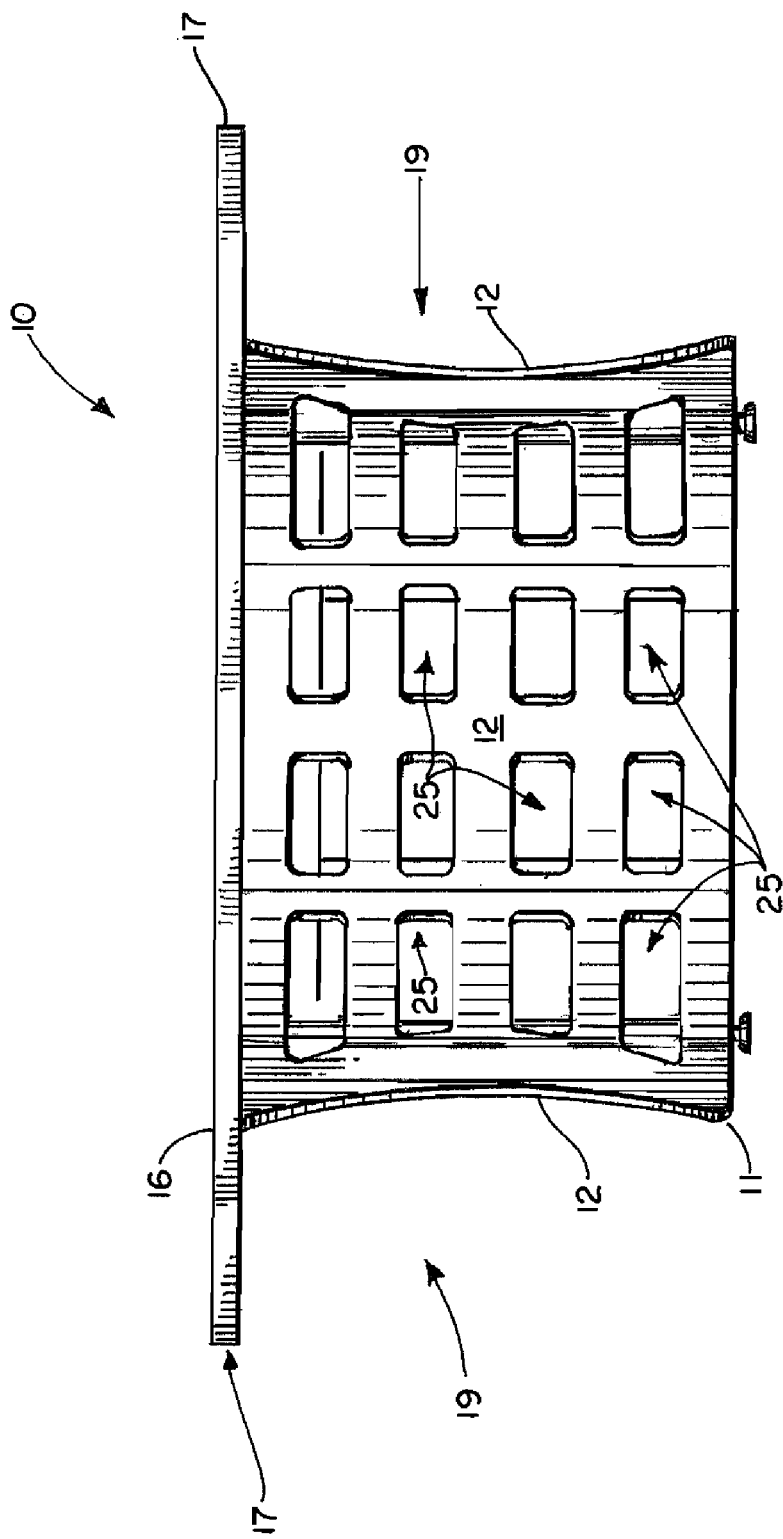
FIG. 3 is a rear view of a preferred embodiment of the apparatus of the present invention, taken along lines 3-3 of FIG. 1.
Figure 4:
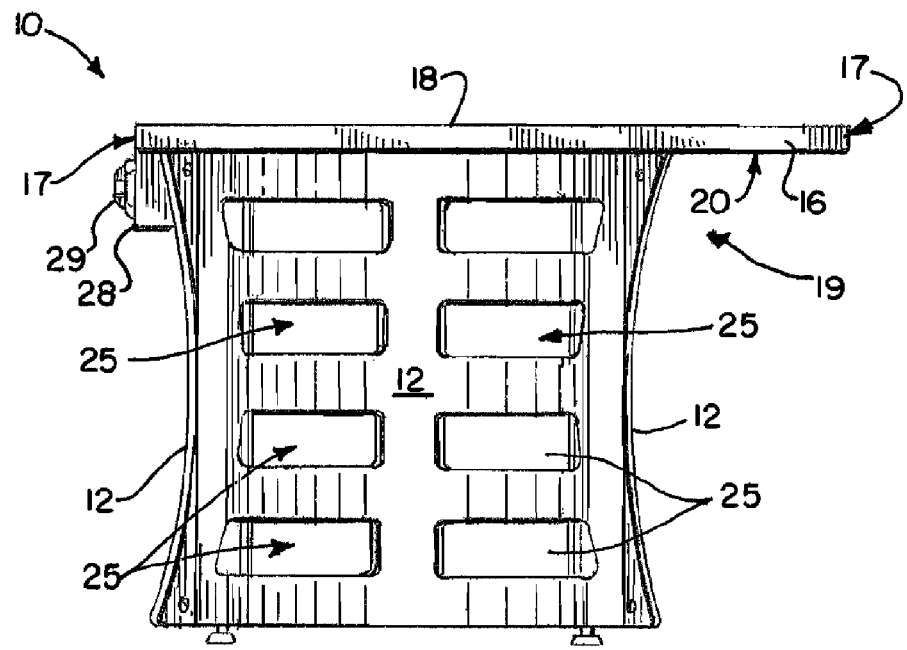
FIG. 4 is a side view of a preferred embodiment of the apparatus of the present invention, taken along lines 4-4 of FIG. 1.

Outdoor cooking apparatus 10 provides a top or tabletop 16 that sits upon pedestal 11 as shown in FIGS. 1-4. Top 16 has a top periphery 17 and a top upper surface 18. In FIGS. 2 and 3, a knee and lower leg area 19 is provided around some of the top periphery 17 but not all of it (e.g. three sides). The tabletop 16 provides an underside or lower surface 20 above knee area 19.

Figure 8:
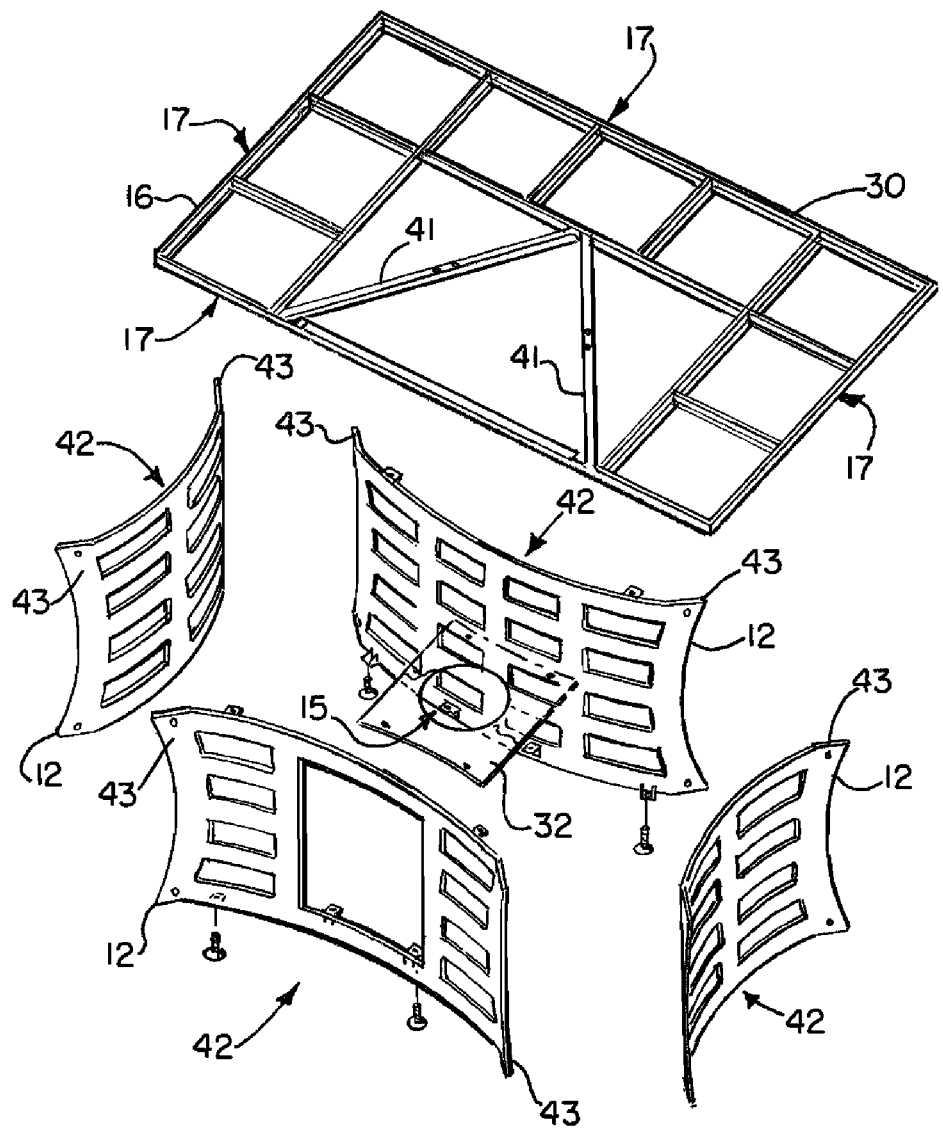
FIG. 8 is an exploded perspective view of a preferred embodiment of the apparatus of the present invention.
Figure 9:
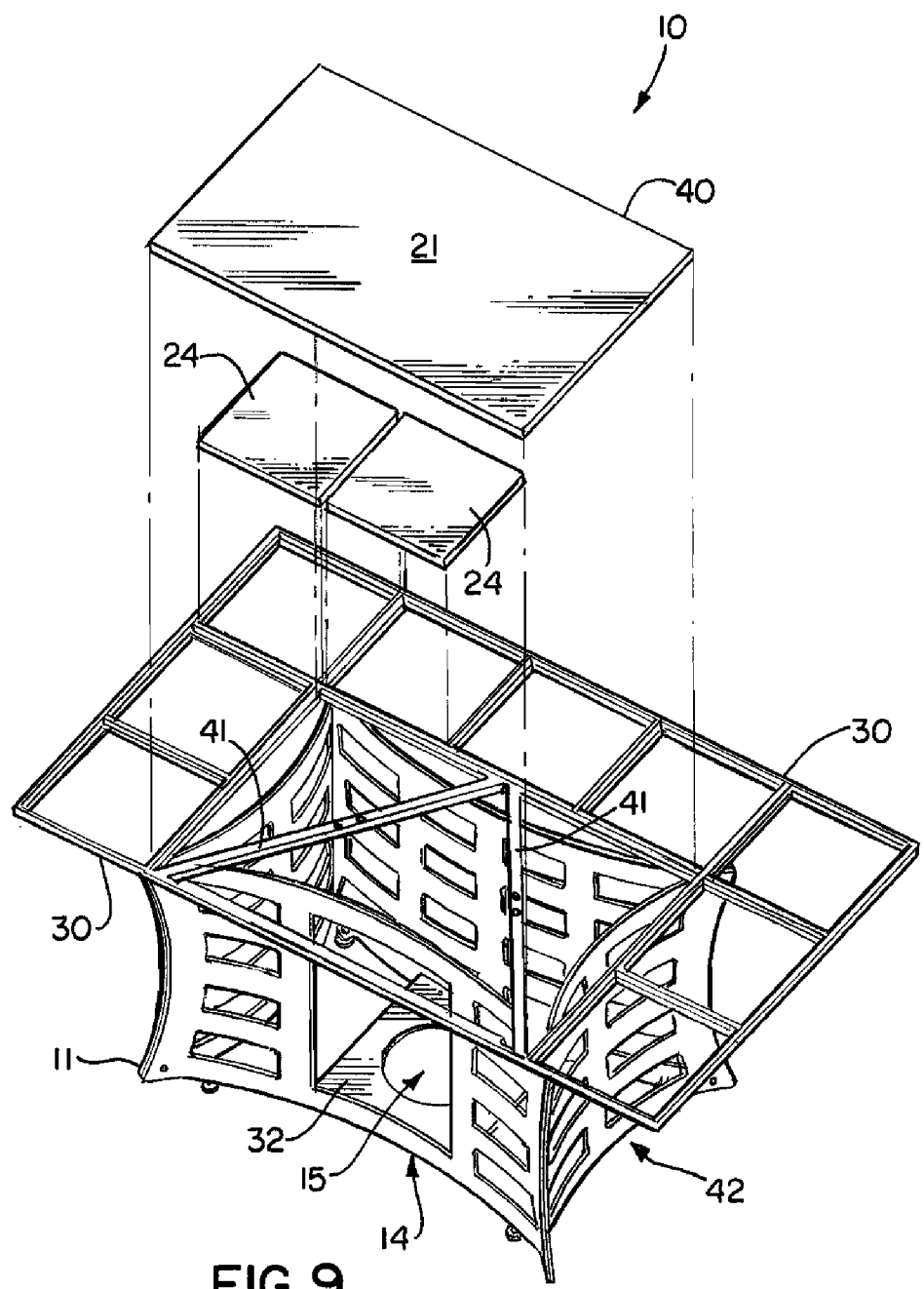
FIG. 9 is an exploded perspective view of a preferred embodiment of the apparatus of the present invention.
Figure 10:
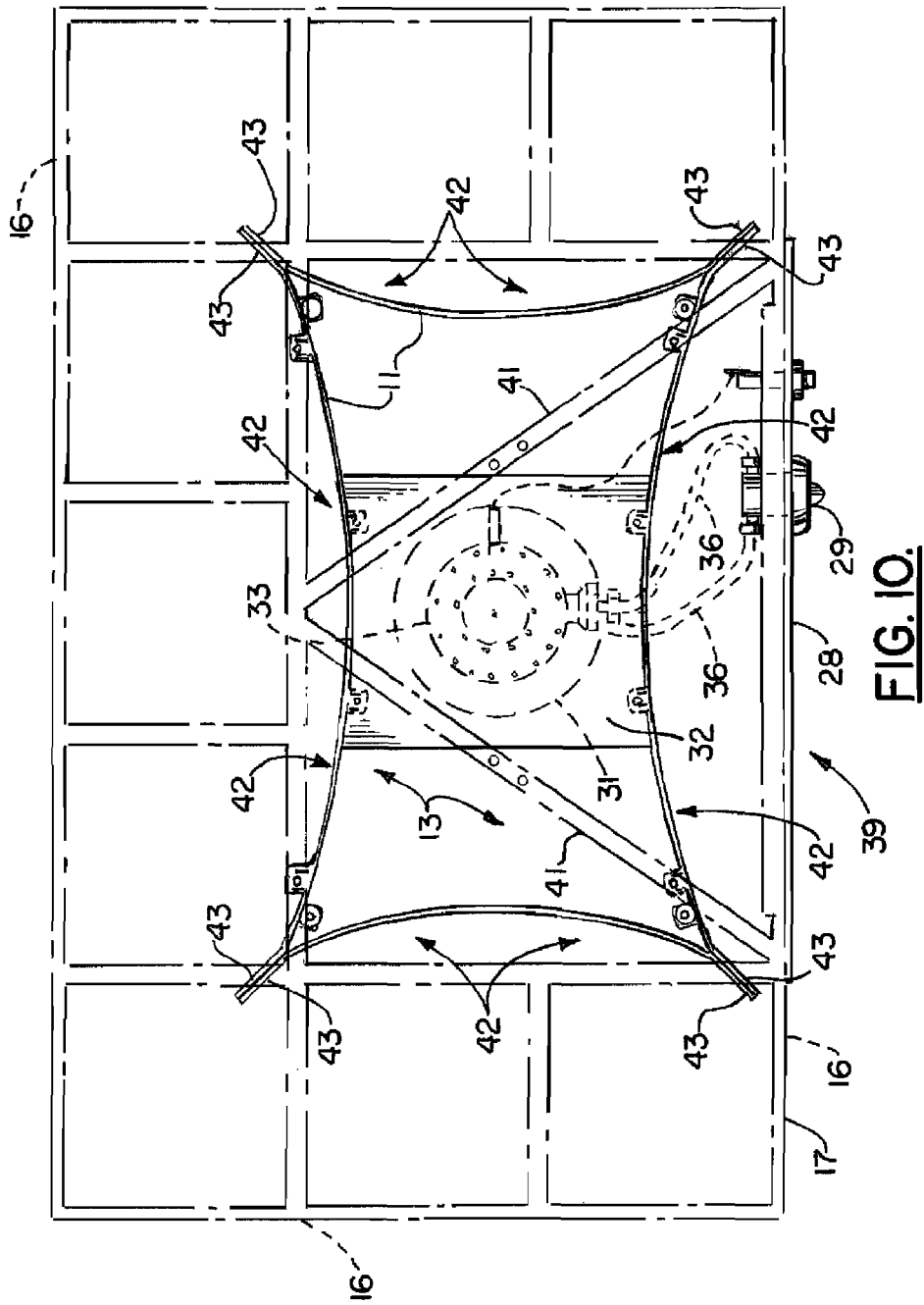
FIG. 10 is a plan view of a preferred embodiment of the apparatus of the present invention.
Figure 11:
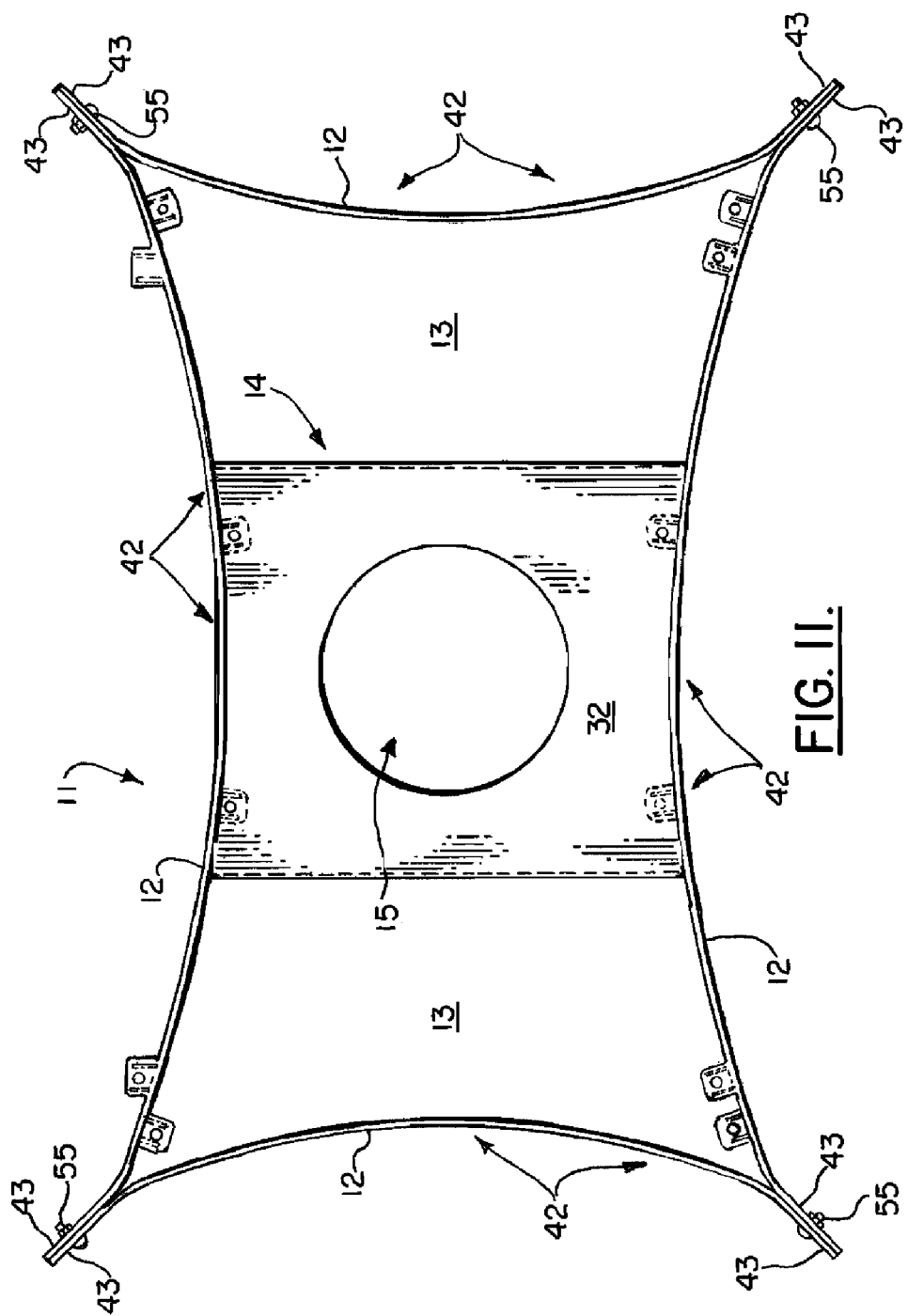
FIG. 11 is a partial plan view of a preferred embodiment of the apparatus of the present invention illustrating the pedestal.

Tabletop 16 provides for a part of its area, a griddle 40 with cooking surface 21 that can be supported by diagonally extending supports 41 of framework 30 (see FIGS. 8-10). A cooking station 39 is provided as an area that a cook 27 can stand next to and cook food that is placed upon cooking surface 21 of griddle 40. Griddle 40 can be a rectangular panel of cast iron or any like food grade cooking or grilling material surrounded by a cool zone 22, 23, 35 or multiple cool zones 22, 23, 35 as shown. In the preferred embodiment, a pair of cool zones 22, 23 are provided on opposite sides of cooking surface 21. Another cool zone can be in the form of a trough 35. Trough 35 can receive food scraps that are scraped from surface 21 during or after cooking.

A burner element 33 is positioned under cooking surface 21. The burner element 33 would preferably be connected to canister 31 using a fuel supply hose 36 and appropriate regulator. Such burner element 33, regulator, and hose 36 are commercially available. Control knob 29 enables a cook or chef 27 to regulate a flame generated by burner element 33.

In between the periphery 17 of top 16 and the area defined by cooking surface 21 and cool zones 22-23, 35 is provided a plurality of tiles 24 that can be removable tiles 24. Tiles 24 can be as an example, 12 inch×12 inch, 18 inch×18 inch or other sized square or rectangular tiles. These tiles 24 can be built-in or removable and merely rest upon top 16. A framework or grillwork 30 of beams can be provided to removably support tiles 24 and griddle 40. In this fashion, the outdoor cooking apparatus 10 of the present invention can be shipped with multiple tiles 24 in a separate box. Tiles 24 can be placed upon tabletop 16 after it is received by an end user. Tiles 24 can be quickly and easily replaced if and when an owner wants to change colors, replace chipped or broken tiles, or remove for cleaning purposes. Tiles 24 could thus be made of dishwasher safe material, which is important since a user or guest 26 will be eating food next to tiles 24.

Figure 5:
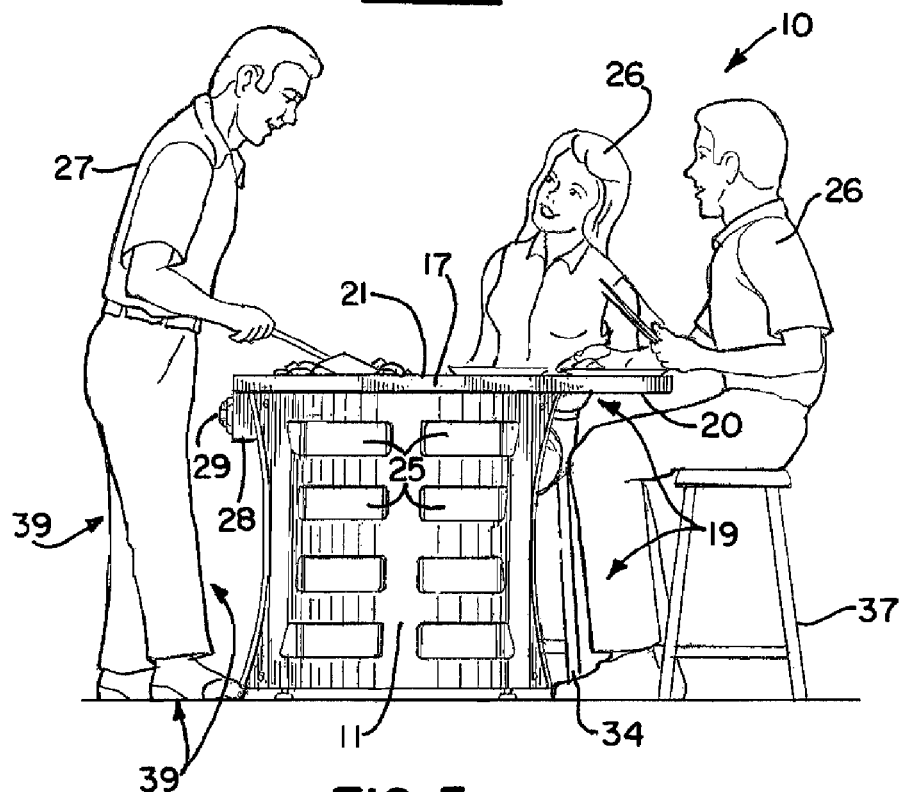
FIG. 5 is a perspective view of a preferred embodiment of the apparatus of the present invention.
Figure 6:
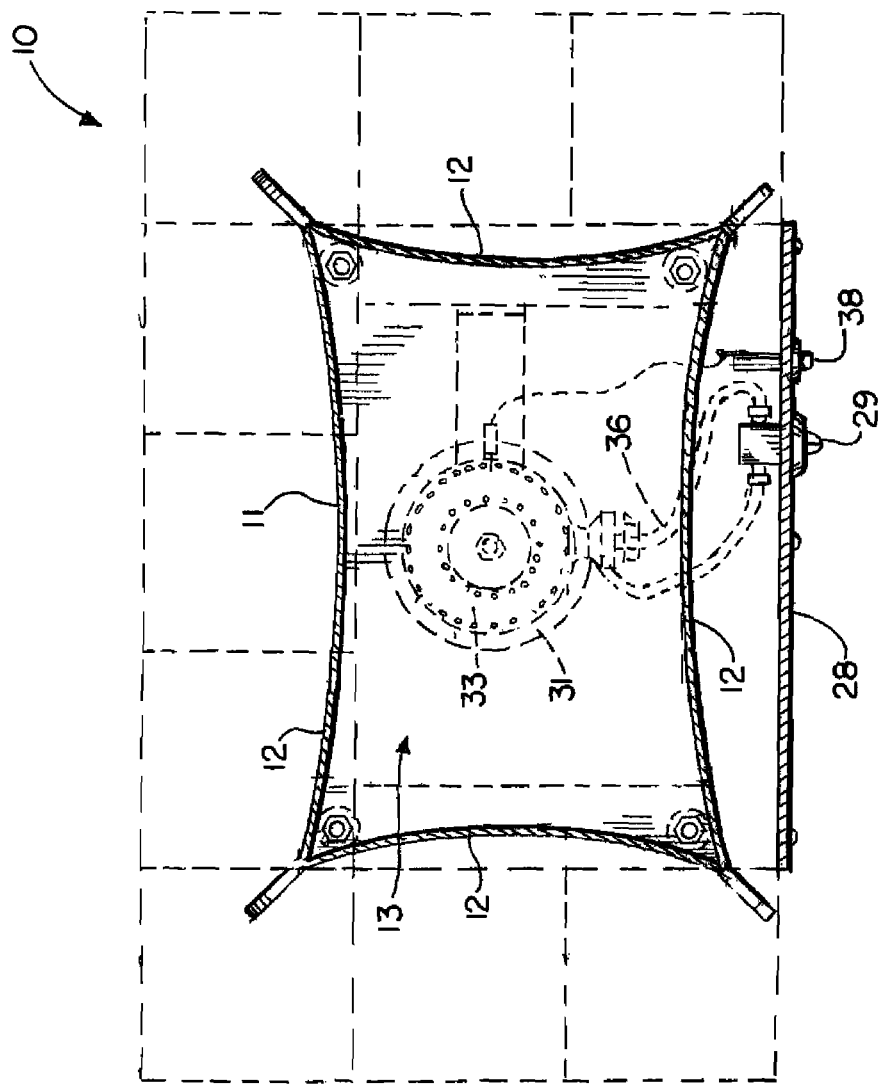
FIG. 6 is a sectional view taken along lines 6-6 of FIG. 2.
Figure 7:
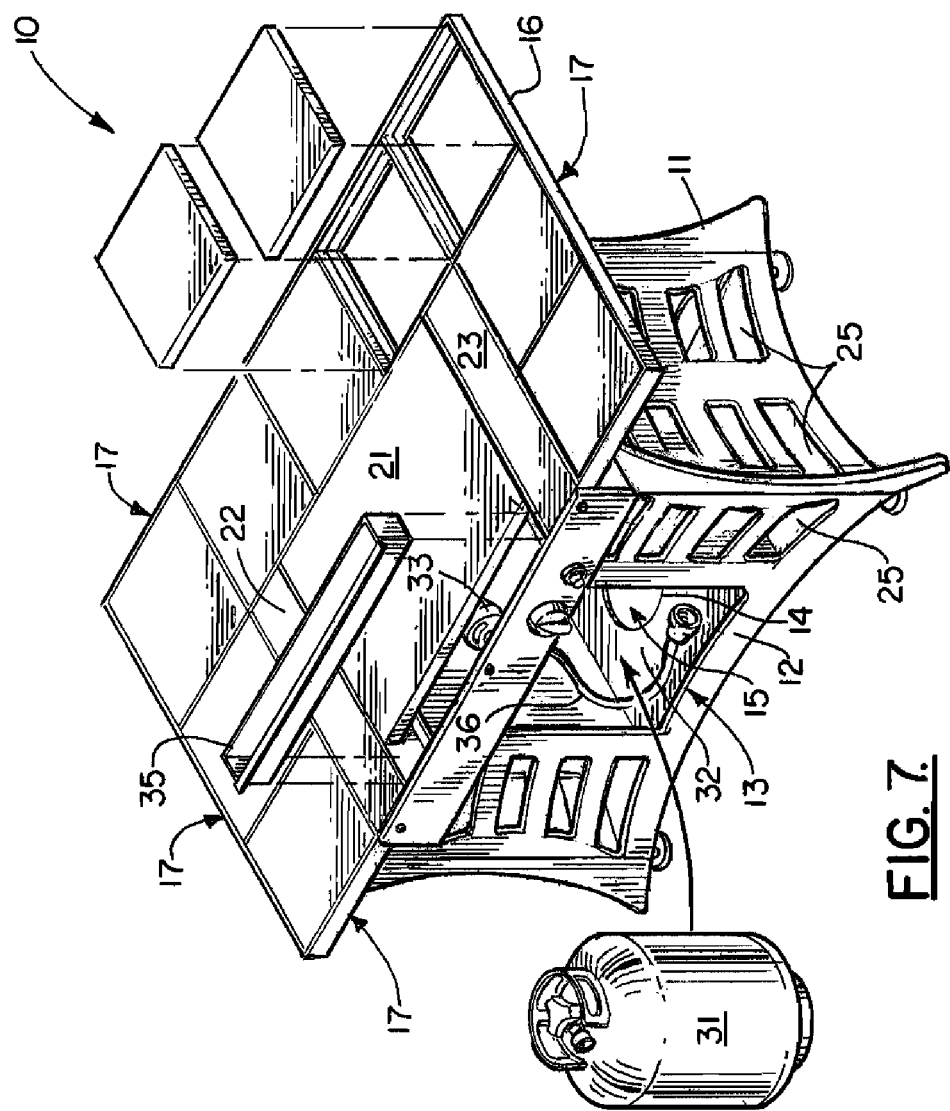
FIG. 7 is a perspective view of a preferred embodiment of the apparatus of the present invention.

In FIG. 5, a chef or cook 27 is shown. Also shown are a plurality of users/guests 26. Each of the users or guests 26 typically sits upon a chair or stool or other seat 34 or 37. Cook or chef 27 stands at cooking station 39 next to control panel 28. The chef or cook 27 operates control panel 28, which provides a knob or knobs 29 for regulating a supply of gaseous fuel (e.g. propane) to burner element 33. A knob or button 38 can be provided for igniting the burner element 33 when gaseous fuel is flowing from canister 31 to burner element 33.

Pedestal walls 12 can be perforated as shown, providing circular or rectangular or other shaped openings 25 to assist in venting heat that is generated below cooking surface 21 and within pedestal 11. Each wall 12 has a concavity 42 that is receptive of the knees/legs of a user or guest 26. Flanges 43 at the ends of each wall 12 can be bolted or otherwise fastened or connected together using fasteners 55, welding or like connection or other suitable connection (see FIGS. 10-11).

Figure 12:
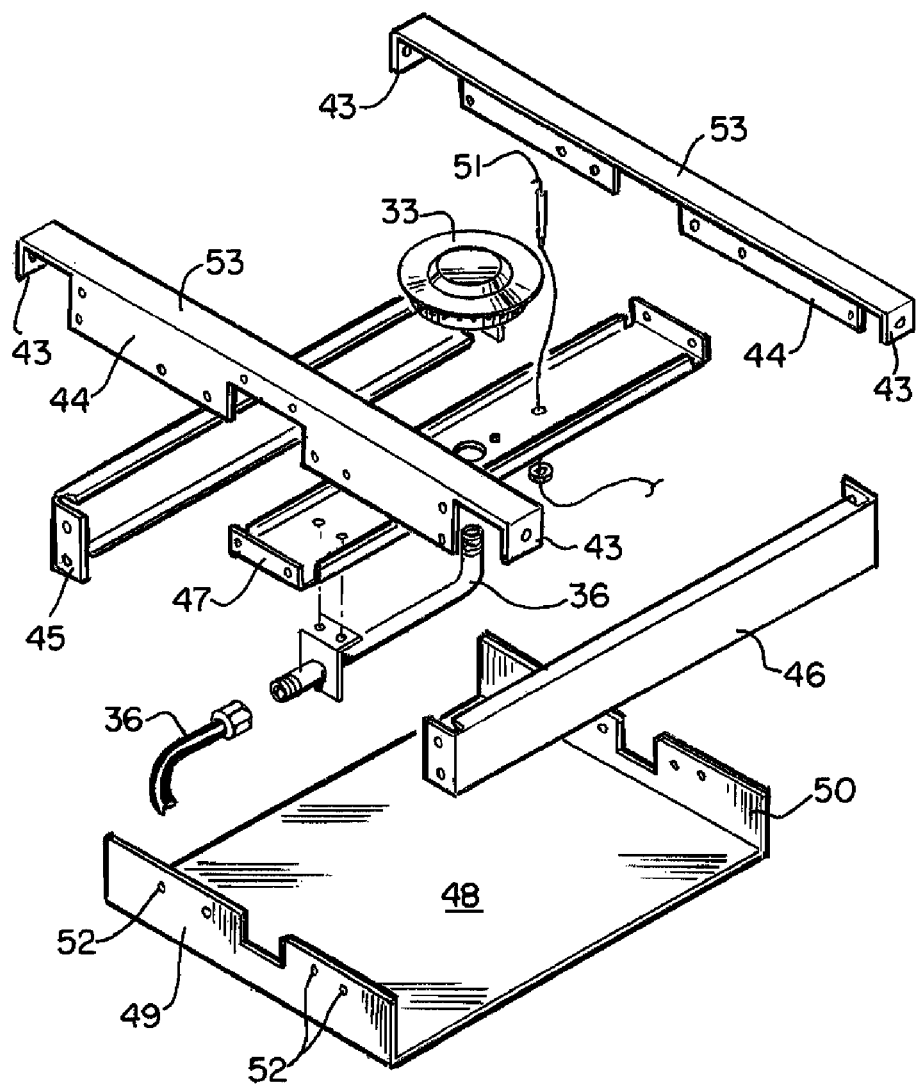
FIG. 12 is a partial perspective exploded view of a preferred embodiment of the apparatus of the present invention illustrating the burner and burner support.
Figure 13:
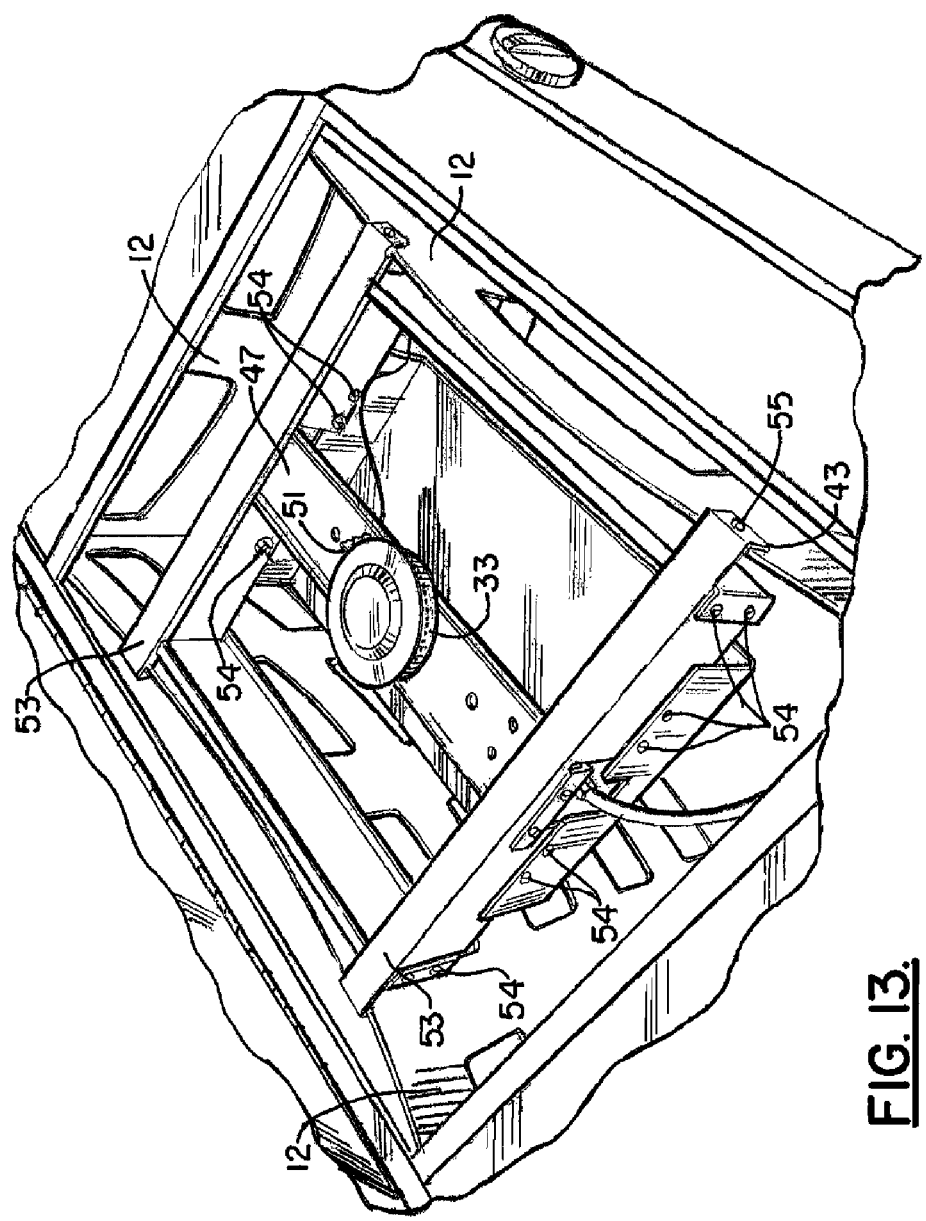
FIG. 13 is a partial perspective view of a preferred embodiment of the apparatus of the present invention illustrating the burner and burner support.

FIGS. 12 and 13 show burner element 33 and the various components that support it upon walls 12 of pedestal 11. Beams 53 each provide flanges 43, 44. The flanges 43 can be used to connect beams 53 to a pair of opposed walls 12 of pedestal 11 using fasteners 55 at provided openings 52 such as bolted connections. Beams 45, 46 and 47 can be bolted or otherwise connected to beams 53 as shown in FIGS. 12-13. Heat shield 48 provides flanges 49, 50 that enable it to be connected to beams 53 using fasteners 54 such as bolted connections, rivets, tack welding or the like. Each beam 45, 46, 47, 53 and heat shield 48 are provided with openings for enabling bolted connections or like fasteners 54 to be employed. Alternatively, these beams 45, 46, 47, 53 and heat shield 48 can be welded together. Beam 47 can likewise be connected to beams 53 using welding or fasteners 54. Beams 47 can support burner element 33 and ignition 51.

The following is a list of parts and materials suitable for use in the present invention.

PARTS LIST

Part Number Description
10 outdoor cooking apparatus
11 pedestal
12 pedestal wall(s)
13 pedestal interior
14 receptacle
15 receptacle opening
16 top
17 top periphery
18 top upper surface
19 knee/lower leg area
20 underside/lower surface
21 cooking surface
22 cool zone
23 cool zone
24 tile
25 opening
26 user/guest
27 chef/cook
28 control panel
29 control knob
30 framework/grillwork
31 canister
32 horizontal panel
33 burner element
34 chair/seat
35 cool zone/trough
36 hose
37 seat
38 knob/button
39 cooking station
40 griddle
41 diagonally extending support
42 concavity
43 flange
44 flange
45 beam
46 beam
47 beam
48 heat shield
49 flange 50 flange
51 ignition
52 opening
53 beam
54 fastener All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An outdoor cooking apparatus comprising:
    a) a pedestal having a pedestal periphery with an area, the pedestal including a plurality of pedestal walls, each wall with an inside surface and an outside surface, a plurality of pedestal corners, an upper end portion, a lower end portion and an interior with a pedestal space;
    b) a fuel canister that is contained within the pedestal space;
    c) a rectangular top supported upon the upper end portion of the pedestal, the top having a top periphery with an area that is larger than the area of the pedestal periphery, said top periphery including four top sides and four top corners;
    d) three of said pedestal walls having an outer surface that is concave relative to a vertical axis, said concave surface extending to said rectangular top to provide a plurality of three knee space areas under the top and in between the pedestal periphery and top periphery, each knee space enabling a user to occupy a seat next to the top and to extend his or her legs under the top and within the top periphery, and wherein each knee space area includes one side of the top periphery, one pedestal wall, and the area under the pedestal top in between the said one side of the top periphery and the outside surface of said one pedestal wall;
    e) wherein each knee space area is separated from another of the knee space areas by a said top corner and a said pedestal corner;
    f) the top having an upper surface, a part of said upper surface being a cooking surface that can be heated to a cooking temperature, said cooking surface having four cooking surface sides;
    g) a plurality of tiles that partially surround the cooking surface, each tile being removable and not adhered to the top;
    h) one side of the top periphery being generally aligned with a side of the cooking surface periphery;
    i) wherein one of the pedestal walls is not a knee space area, providing a chefs station for a chef wherein the cooking surface extends to the top periphery;
    j) the chefs station having one or more control knobs that enable a chef to control the cooking surface temperature when the chef is occupying the chefs station; and
    k) one or more cool zone areas that are not part of the cooking surface or tiles and each being positioned in between one or more tiles and the cooking surface; and
    l) ventilation openings in each said pedestal wall extending through the pedestal wall from the inside surface to the outside surface thereof.

2. The outdoor cooking apparatus of claim 1 wherein the top is rectangular and the cooking surface is rectangular, a side of the top being generally aligned with a side of the cooking surface.

3. The outdoor cooking apparatus of claim 1 wherein the cooking surface is a generally flat griddle with burner element under the flat griddle, said burner element being fueled with a gaseous fuel canister stored inside the pedestal.

4. The outdoor cooking apparatus of claim 1 wherein the pedestal walls provide openings spaced from the pedestal upper end portion to the pedestal lower end portion.

5. The outdoor cooking apparatus of claim 1 wherein the pedestal is perforated.

6. The outdoor cooking apparatus of claim 1 wherein the pedestal has a generally rectangular transverse cross section.

7. The outdoor cooking apparatus of claim 1 wherein the top has four sides, and three of said sides have a knee area in between the pedestal and a said side, a fourth side of the top providing said cooking station, and wherein there is not a knee area next to the cooking station.

8. The outdoor cooking apparatus of claim 1 wherein the top has four sides, and three of said sides have a knee area in between the pedestal and the top periphery, a fourth side of the top providing a cooking station for a cook who is standing next to the fourth side, and wherein there is not a knee area next to the cooking station.

9. An outdoor cooking apparatus comprising:
    a) a pedestal having a periphery with an area, the pedestal including multiple pedestal walls, each pedestal wall having an outer concave surface that is concave relative to a vertical axis, a pedestal corner defining a connection of one pedestal wall to another pedestal wall, an upper end portion, a lower end portion and an interior with a receptacle space that enables a fuel canister to be contained within the pedestal;
    b) a top supported upon the upper end portion of the pedestal, the top having a top periphery that has an area that is larger than the area of the pedestal periphery, the top periphery having four top sides and four top corners;
    c) each pedestal wall concave outer surface extending to said top;
    d) three of said walls being concave to provide a plurality of three knee space areas under the top, each knee space area extending between a pedestal wall and a top periphery side and being the area under the top and in between the said pedestal wall and the said top periphery side, each knee space enabling a user to occupy a seat next to the top and to extend his or her knees under the top and within the top periphery;
    e) wherein each knee space area is separated from another of the knee space area by a said top corner and a said pedestal corner;
    f) the top having an upper surface, a part of said surface being a cooking surface having cooking surface sides, and a part of said upper surface that is not the cooking surface being multiple tiles;
    g) a part of the top periphery being one of the top sides that is a cooking station with no knee space area; and
    h) ventilation openings in each said pedestal wall extending through the pedestal wall from the inside surface to the outside surface thereof.

10. The outdoor cooking apparatus of claim 9 wherein the top is rectangular and the cooking surface is rectangular, a side of the top periphery being generally aligned with a side of the cooking surface.

11. The outdoor cooking apparatus of claim 9 wherein the concave surface defines in part the knee area.

12. The outdoor cooking apparatus of claim 9 wherein the cooking surface is a generally flat griddle with burner element under the flat griddle, said burner element being fueled with a gaseous fuel canister stored inside the pedestal.

13. The outdoor cooking apparatus of claim 9 wherein the pedestal walls are perforated.

14. The outdoor cooking apparatus of claim 9 wherein the pedestal is comprised of multiple walls, a majority of the walls having an outer facing concave shape.

15. The outdoor cooking apparatus of claim 9 wherein the pedestal has a generally rectangular transverse cross section.

16. An outdoor cooking apparatus comprising:
   a) a pedestal having a periphery with an area, the pedestal including multiple pedestal walls, each pedestal wall having an upper edge, a lower edge, and an outer concave surface that is concave relative to a vertical axis, a pedestal corner defining a connection of one pedestal wall to another pedestal wall, the pedestal having an upper end portion, a lower end portion and an interior with a receptacle space that enables a fuel canister to be contained within the pedestal;
   b) a top supported upon the upper end portion of the pedestal, the top having a top periphery that has an area that is larger than the area of the pedestal periphery, the top periphery having four top sides and four top corners;
   c) each pedestal wall concave outer surface extending to said top and to said lower edge;
   d) three of said walls having an outer wall surface that is concave to provide a plurality of three knee space areas under the top, each knee space area extending between a pedestal wall and a top periphery side and being the area under the top and in between the said pedestal wall and the said top periphery side, each knee space enabling a user to occupy a seat next to the top and to extend his or her knees under the top and within the top periphery;
   e) wherein each knee space area is separated from another of the knee space area by a said top corner and a said pedestal corner;
   f) the top having an upper surface, a part of said surface being a cooking surface having cooking surface sides, and a part of said upper surface that is not the cooking surface;
   g) a part of the top periphery being one of the top sides that is a cooking station.

17. The outdoor cooking apparatus of claim 16 further comprising ventilation openings in each said pedestal wall extending through the pedestal wall from the inside surface to the outside surface thereof.

18. The outdoor cooking apparatus of claim 16 wherein each pedestal corner is formed by overlapping sections of two of said pedestal walls.

19. The outdoor cooking apparatus of claim 16 wherein one of said pedestal walls having an outer concave surface is spaced away from and opposite said cooking station.

20. The outdoor cooking apparatus of claim 16 wherein each concave outer surface extends from said pedestal wall upper edge to said pedestal wall lower edge.

21. The outdoor cooking apparatus of claim 16 wherein each of said upper and lower edges are concave.

* * * * *